United States Patent [19]
Johnson

[11] Patent Number: 5,274,671
[45] Date of Patent: Dec. 28, 1993

[54] USE OF OUTPUT IMPEDANCE CONTROL TO ELIMINATE MASTERSHIP CHANGE-OVER DELAYS IN A DATA COMMUNICATION NETWORK

[75] Inventor: Leith L. Johnson, Fort Collins, Colo.

[73] Assignee: Hewlett Packard Company, Palo Alto, Calif.

[21] Appl. No.: 744,852

[22] Filed: Aug. 14, 1991

[51] Int. Cl.$^5$ ............................................... H04B 3/00
[52] U.S. Cl. ..................... 375/36; 370/85.1; 333/32
[58] Field of Search .................. 375/36; 307/443, 263; 333/17.1, 32, 17.3, 124; 370/85.1

[56] References Cited

U.S. PATENT DOCUMENTS

| | | | |
|---|---|---|---|
| 3,619,504 | 11/1971 | De Veer | 375/36 |
| 4,388,725 | 6/1983 | Saito et al. | 375/36 |
| 4,445,048 | 4/1984 | Graham | 375/36 |
| 4,803,699 | 2/1989 | Graham | 375/36 |
| 4,947,144 | 8/1990 | Le Nohaic | 375/36 |
| 5,046,072 | 9/1991 | Shimizu et al. | 375/36 |
| 5,097,483 | 3/1992 | Bechtolsheim | 375/36 |

Primary Examiner—Curtis Kuntz
Assistant Examiner—T. Ghebretinsae

[57] ABSTRACT

An output resistance ($R_O$) is situated at each output of a plurality of drivers communicating to a plurality of receivers via an interconnect network which is biased by a terminal supply voltage ($V_T$). The output resistance $R_O$ eliminates the need for a wait period in a cycle, which wait period is usually required when mastership of the interconnect network changes over from one driver to another driver. The drivers and receivers are two-state devices. For a logic high, the drivers exhibit a virtually infinite resistance. Consequently, the interconnect network exhibits a high voltage $V_{INT}$, which is approximately equal to the terminal supply voltage $V_T$. Whereas for a logic low, the drivers sink current from the interconnect network, thereby pulling the interconnect network voltage $V_{INT}$ towards ground. Any signal below about $(\frac{3}{8})*V_T$ is recognized by the receivers as a logic low, while any signal above this threshold is recognized as a logic high. In the case of a logic low, the voltage $V_{INT}$ is prevented from being pulled to ground by the output resistance ($R_O$). The driver sinks enough current so that the voltage $V_{INT}$ is approximately equal to $V_T/2$. Accordingly, if a change over occurs in a cycle after a logic low, the newly active driver can immediately drive a logic high or low onto the interconnect network, because the voltage $V_T/2$ is readily available on the interconnect network. If the newly active driver wishes to drive a logic high, the driver exhibits infinite resistance, and the voltage $V_{INT}$ increases to $V_T$. If the newly active driver wishes to drive a logic low, the driver sinks current, and the voltage $V_{INT}$ increases to only about $(\frac{3}{8})*(V_T)$, which is recognized as a logic low. The voltage $V_{INT}$ will ultimately decrease to $V_T/2$, thereby enhancing its disposition as a logic low.

16 Claims, 7 Drawing Sheets

USE OF OUTPUT IMPEDANCE CONTROL TO ELIMINATE MASTERSHIP CHANGE-OVER DELAYS IN A DATA COMMUNICATION NETWORK

BACKGROUND OF THE INVENTION

I. Field Of The Invention

The present invention relates to data transfer in a computer system, and more particularly, to optimizing time efficiency during a data transfer cycle in a data communication network.

II. Related Art

Many conventional communication networks and protocols are known in the art for the transfer of data in a computer system. Data in the context of this document refers to any type of information, including actual data, instructions, or the like, in whole or in part, and in a processed or unprocessed condition. Transfers of data can occur within a processor, memory board, or some other computer subsystem or between computer subsystems via, for example, electronic wiring, a bus network or a computer backplane.

FIG. 1 illustrates a general data communication network wherein n drivers 102,104 communicate to m receivers 106,108 via an interconnect network 110. The interconnect network 110 is biased by a terminal supply voltage $V_T$. Moreover, the interconnect network 110 has an intrinsic characteristic impedance $Z_0$, which is matched by a terminal resistance $R_T$ in order to minimize reflections on the interconnect network 110. The concept of minimizing reflections via a terminal resistance is well known in the art. Typically, the interconnect network 110 is terminated at both ends by a resistance $R_T$ equal to $Z_0$. Thus, a driver sees a load impedance equal to $R_T/2$ when it drives data onto the interconnect network 110.

Furthermore, in FIG. 1, it should be noted that one and only one of the n drivers 102,104 drives data on the interconnect network 110 at a given time. However, any number of the m receivers 106, 108 may participate in listening to the data being driven onto the interconnect network 110.

The n drivers 102, 104 are two-state devices. In order to transfer information from any of the n drivers 102,104 to one or more of the m receivers 106, 108 the active driver either pulls the interconnect network 110 to ground potential to indicate a logic low ("0") or exhibits a high resistance (resistance=>infinity) to indicate a logic high ("1").

More specifically, consider the scenario when the driver 102 is active. When the active driver 102 wishes to indicate a logic low, it pulls the interconnect network 110 to ground potential by sinking the current $I_O$ into the driver 102. Because of the current flow $I_O$, the voltage (approx. $V_T$) appearing on the interconnect network 110 is substantially diminished. Conceptually, the logic signal is sent in one direction while the current $I_0$ travels in the opposite direction. Worth noting is that a time delay exists between the point at which the driver 102 initiates transfer of the logic signal and the point at which the interconnect network 110 ultimately exhibits the intended logic low. The time delay depends largely upon both the internal impedance of the driver 102 and the characteristic impedance of the interconnect network 110. In the convention, the trend has been to steadily decrease the internal impedance of the drivers 102, 104, which are usually integrated circuits (IC), so as to increase the network speed.

In contrast, when the active driver 102 wishes to indicate a logic high by exhibiting a high resistance, the current $I_T$ equals approximately zero, and accordingly, the voltage $V_T$ appears on the interconnect network 110. Further, a time delay exists between the point at which the driver 102 initiates the logic high and the point at which the interconnect network 110 will exhibit the intended logic high.

FIG. 2 illustrates an example of a timing diagram for the data communication network of FIG. 1. As illustrated in FIG. 2, the 1st driver 102 may take control of the interconnect network 110 for a number of interconnect network cycles, and then, relinquish control of the interconnect network 110 to the nth driver 104, which can then control the interconnect network 110 for any number of cycles. When a driver takes control of the interconnect network 110, i.e., reads or writes data, in the convention the driver is said to have "mastership", "tenureship", or "ownership" of the interconnect network. Furthermore, during mastership of the interconnect network 110, time must be allocated to the necessary features of driver delay, interconnect network delay, receiver setup time for latching data, and a few other minor considerations. In the art, the trend is to make each cycle as fast as possible so as to increase the speed of the overall system, while providing for the preceding features.

As further shown in the example of FIG. 2, the 1st driver 102 controls the interconnect network 110 for interconnect network cycles 1 and 2, and then relinquishes control in cycle 3. In other words, a "change over" in mastership has occurred. Significantly, a "dead time", or wait period, as indicated by reference numeral 202, must be inserted in cycle 3, just before the nth driver 104 takes control of the interconnect network 110. The wait period must be inserted in order to avoid driver conflicts and provide proper transmission of logic signals. The wait period is undesirable because it slows the data communication network.

One solution to eliminate the wait period 202 required in cycle 3 is to uniformly increase the time periods of the cycles to allocate some time for a change-over in mastership. For instance, in the example of FIG. 2, the 1st driver 102 would terminate its mastership during cycle 2, and not in cycle 3, so that the nth driver 104 could take control of the interconnect network 110 at the beginning of cycle 3. The foregoing solution would be adequate in systems where driver change-overs occur very often. However, this solution is inadequate in many communication networks where drivers take control of the interconnect network 110 for a number of cycles. In such communication networks, the active driver having control of the interconnect network 110 pays a performance penalty (change over time) during each cycle it has control. The performance penalties for each cycle aggregate into an undesirable amount of wasted time.

SUMMARY OF THE INVENTION

The present invention is a system and method for optimizing the speed of a data communication system employing a plurality of two-state drivers communicating to a plurality of two-state receivers via an interconnect network. The interconnect network is biased by a terminal supply voltage $V_T$ through a terminal resistance $R_T$, whose magnitude equals the magnitude of the characteristic impedance $Z_0$ of the interconnect network. The present invention envisions providing an output resistance $R_O$ between the interconnect network and each driver output. The output resistance $R_O$ is equal to about half of the terminal resistance $R_T$ in the preferred embodiment.

In accordance with the present invention, mastership over the interconnect network can change within a cycle without the need for a wait period, thereby resulting in a substantial time savings. In other words, two drivers may temporarily and concurrently affect the voltage $V_{INT}$ on the interconnect network when the change over occurs without adverse effects to the intended logic state on the interconnect network.

More specifically, a method in accordance with the present invention involves the following steps. A logic low is first driven onto the interconnect network via a first driver. The voltage (first voltage) corresponding to the logic low is somewhere between the terminal supply voltage $V_T$ and ground. In the preferred embodiment, the first voltage is approximately one half of the terminal supply voltage $V_T$. Control over the interconnect network is relinquished by the first driver. Another logic low is immediately induced on the interconnect network by sinking current into a second driver so that the interconnect network exhibits another voltage (second voltage) which is somewhere between the terminal supply voltage $V_T$ and the first voltage. Finally, the second voltage is recognized as a logic low at one or more of the receivers.

In the preferred embodiment, the second voltage is approximately equal to three quarters of the terminal supply voltage $V_T$. Moreover, the second voltage will eventually reduce to the first voltage.

The present invention further provides for the following additional features and advantages.

The present invention provides for a very high performance data communication network. Logic can be transferred in the data communication network without any driver conflicts.

Still another feature of the present invention is that it allows for wire-ORing.

Yet another advantage of the present invention is that it simplifies the protocol of data communications on the interconnect network.

Another advantage of the present invention is that the output resistance of the drivers is better controlled. This precise control results in high signal fidelity in the data communication network.

Further features and advantages of the present invention will become apparent to one of ordinary skill in the art upon examination of the following drawings and the detailed description. It is intended that any additional features and advantages be incorporated herein.

BRIEF DESCRIPTION OF THE DRAWINGS

The present invention, as defined in the claims, can be better understood with reference to the text and to the following drawings.

DETAILED DESCRIPTION OF THE PREFERRED EMBODIMENT

Figure 1:
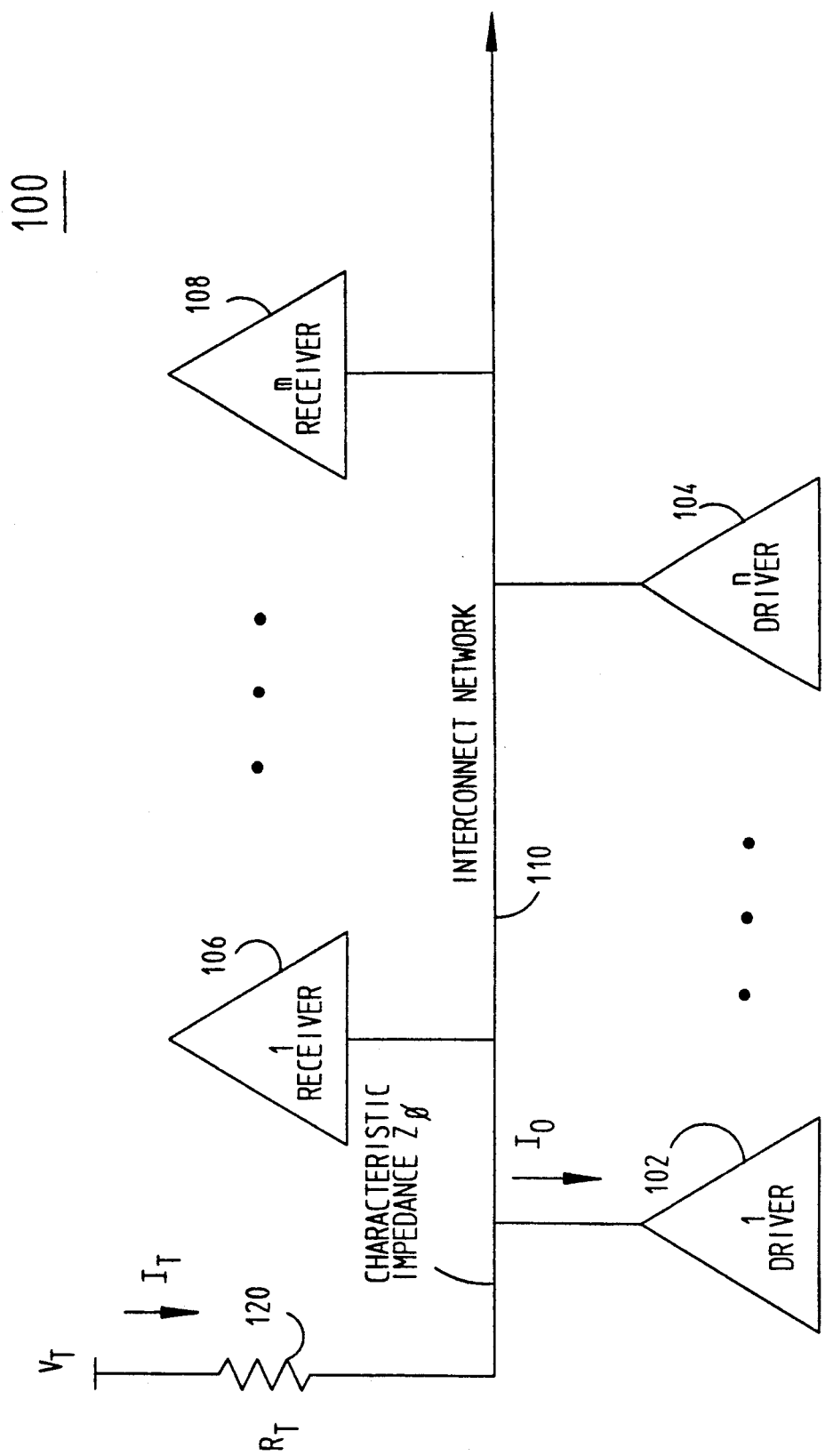
FIG. 1 illustrates a data communication network wherein n two-state drivers communicate with m two-state receivers via an interconnect network which has a characteristic impedance $Z_0$ and which is biased by a terminal supply voltage $V_T$ through a terminal resistance $R_T$.
Figure 2:
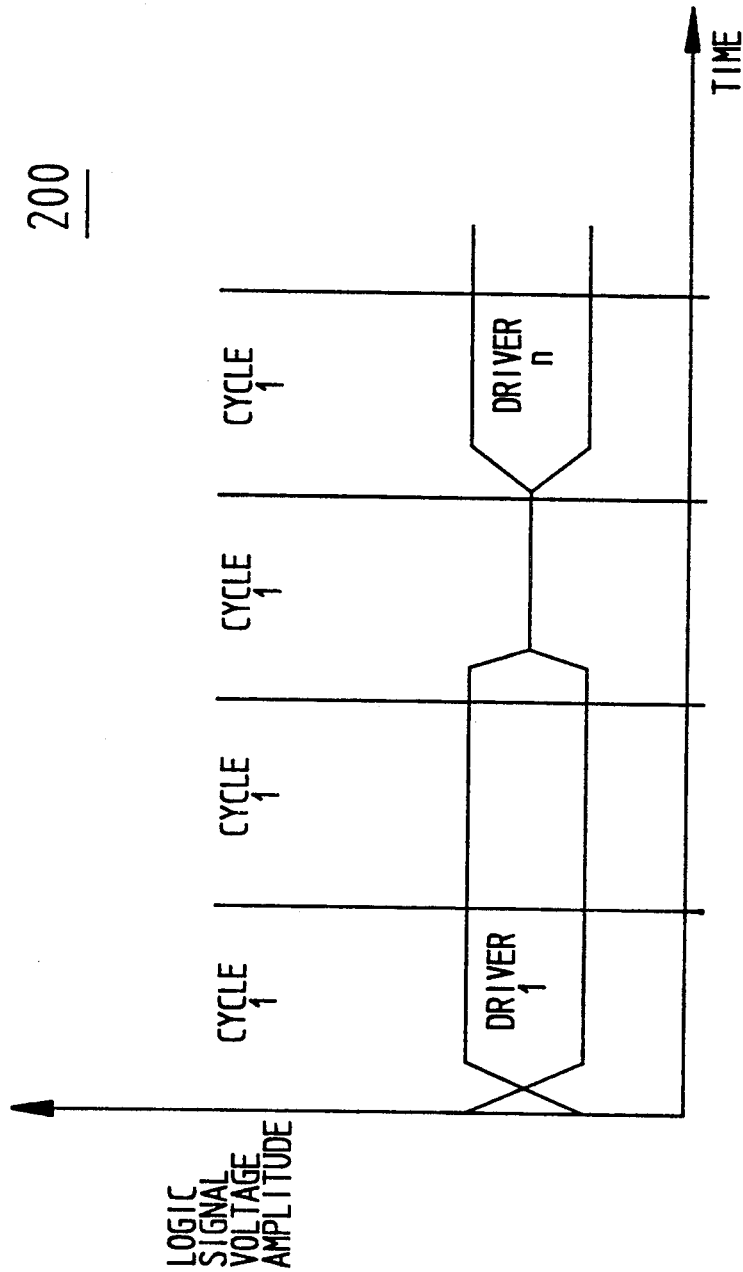
FIG. 2 shows a timing diagram for the data communication network illustrated in FIG. 1.
Figure 3:
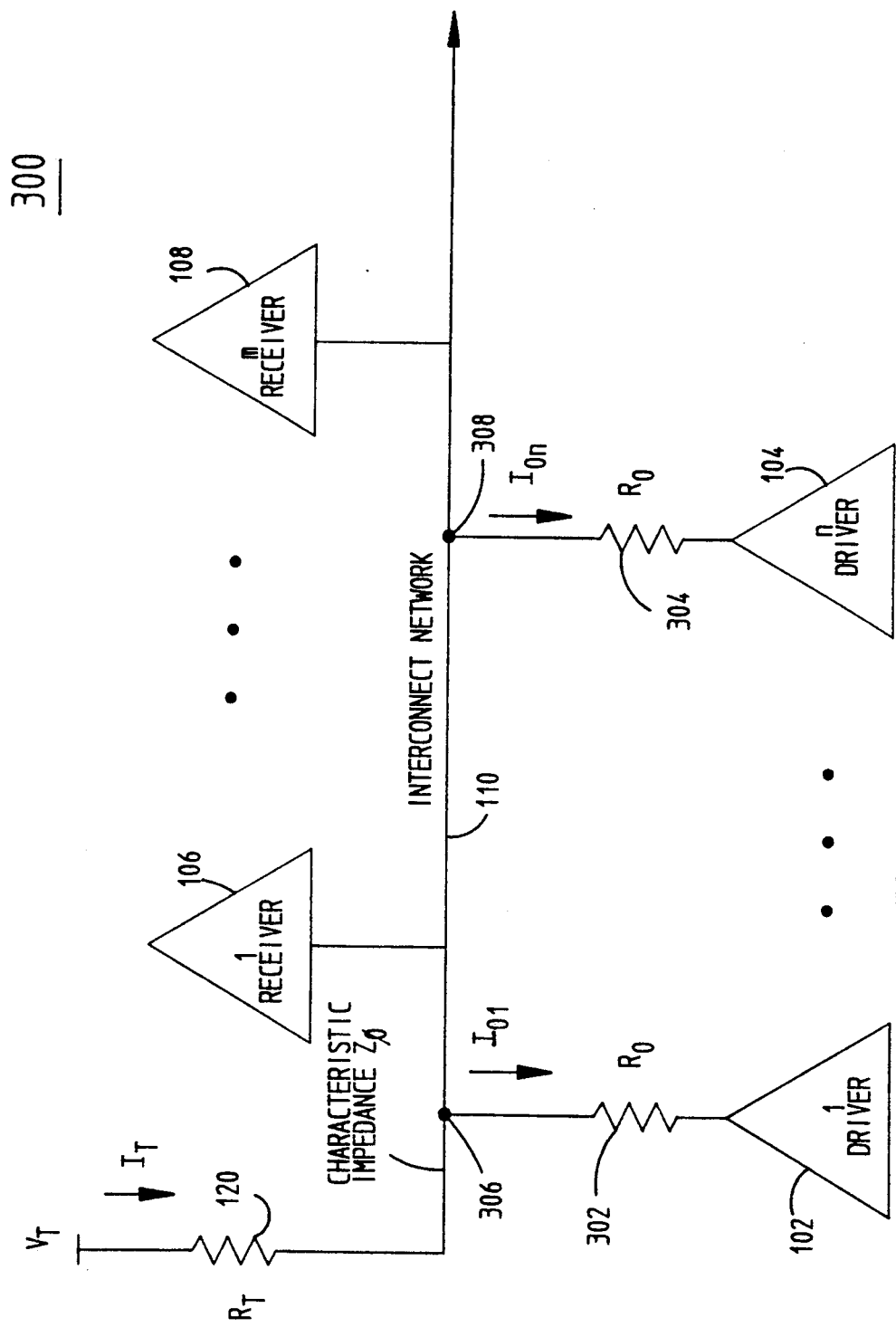
FIG. 3 illustrates the present invention wherein an output resistance $R_O$ is situated between each driver output and the interconnect network so that the voltage swing of the interconnect network voltage $V_{INT}$ is reduced.

The present invention is illustrated in FIG. 3 within a data communication network having n two-state drivers 102, 104 communicating with m two-state receivers 106, 108 via an interconnect network 110. The interconnect network 110 is biased by a terminal supply voltage $V_T$. The interconnect network 110 has an intrinsic characteristic impedance $Z_0$, which is matched by a terminal resistance $R_T$ in order to minimize reflections on the interconnect network 110. The concept of minimizing reflections on a data transmission line is well known in the art, and accordingly, a discussion in this regard is not presented here.

The m receivers 106, 108 are sensitive receivers implemented to detect a logic low as any signal below about $(\frac{7}{8})*(V_T)$, and a logic high as any signal above the same. An example of a receiver which can be utilized in the present invention is disclosed in U.S. Pat. No. 5,097,157, filed Nov. 11, 1990, which has commonality in assignee to the present invention and which is incorporated herein by reference. However, it should be noted that many implementations of the m receivers 106, 108 are possible, as is well known by those skilled in the art.

In accordance with the present invention, an output resistance $R_O$ is situated at each driver output of the n drivers 102, 104. The resistance $R_O$ is approximately equal to about half of the terminal resistance $R_T$. The derivation of the value of the resistance $R_O$, in accordance with another aspect of the present invention, will be discussed with regard to FIGS. 4 and 5 hereafter.

The output resistance $R_O$ in the preferred embodiment is implemented external to each n driver 102, 104 in the form of a discrete element, because the resistance value of such discrete elements can be more precisely controlled in manufacture than integrated circuit elements and like technologies. A field effect transistor (FET), bipolar transistor, or some other like device, situated within each n driver 102, 104 and in series with the resistance $R_O$ is utilized to switch the resistance $R_O$ to either an open circuit or ground in order to thereby provide for the two logic states, high and low, respectively. Consequently, the application of the resistance $R_O$ is easily and precisely controlled as well as easily implemented.

The resistance $R_O$ serves several purposes in the present invention. First, the resistance $R_O$ enhances the fidelity of logic signals communicated on the interconnect network 110 by reducing the adverse effects of non-ideal elements, thereby increasing the noise margin.

Furthermore, the resistance $R_O$ allows a change-over in mastership with no need for waiting periods in the data communications protocol. In the conventional art, waiting periods are introduced into data communications protocols so that when mastership over the interconnect network 110 changes, concurrent driving of the interconnect network 110 does not occur to thereby adversely interfere with logic communications. The output resistance $R_O$ reduces the amount of voltage swing on the interconnect network 110 which permits a brief period of driving overlap during a mastership change over without adverse effects.

More specifically, consider the hypothetical scenario when the 1st driver 102 is assuming mastership of the interconnect network 110 after the nth driver 104 has relinquished mastership. If the nth driver 104 has previously invoked a logic high on the interconnect network 110, then the 1st driver 102 can immediately invoke either a logic high or a logic low, thereby propagating a logic signal to one or more receivers 106, 108. The reason is that a voltage $V_T$ is immediately available on the interconnect network 110. If the 1st driver 104 wishes to invoke a logic high, then it merely exhibits a high resistance to thereby preserve $V_{INT}=V_T$. Recall that any signal over $(\frac{7}{8})*V_T$ on the interconnect network 110 is recognized as a logic high in the present invention. Alternatively, if the 1st driver 104 wishes to invoke a logic low, then the voltage $V_{INT}=V_T$ is available on the interconnect network 110 to sink current $I_{O1}$ into the 1st driver 102, thereby forcing $V_{INT}$ towards ground and, more importantly, below the logic threshold $(\frac{7}{8})*V_T$.

Even more significantly, when the nth driver 104 has already pulled the interconnect network 110 to a logic low, and then, subsequently, the 1st driver 102 wishes to pull the interconnect network 110 to either a logic high or a logic low, the 1st driver 102 can still immediately send a logic signal on the interconnect network 110 during the same cycle because of the output resistance $R_O$, in accordance with the present invention. Immediately after the nth driver 104 relinquishes control over the interconnect network 110, the interconnect network voltage $V_{INT}$ is approximately $V_T/2$. Recall that any signal on the interconnect network 110 below approximately $(\frac{7}{8})*V_T$ is recognized as a logic low in the present invention.

If the 1st driver 102 wishes to subsequently invoke a logic high on the interconnect network 110 after the nth driver 104 has driven a logic low and then relinquishes mastership, then the 1st driver 102 imposes a high resistance. As a result, the interconnect network voltage $V_{INT}$ is permitted to ultimately increase from $V_T/2$ to $V_T$. With respect to the transitional period, a voltage $V_T$ initially appears on the interconnect network 110 at a position denoted by a reference numeral 308 and propagates down the interconnect network 110 to a position denoted by a reference numeral 306. In other words, the voltage $V_T/2$ at the reference numeral 308 is pulled to $V_T$, thereby indicating a logic high since $V_T$ is greater than $(\frac{7}{8})*V_T$.

Alternatively, if the 1st driver 102 wishes to invoke a logic low on the interconnect network 110, then the 1st driver 102 sinks current $I_{O1}$ from the interconnect network 110. Upon sinking the current $I_{O1}$, the voltage $V_{INT}$ at the reference numeral 306 is approximately $V_T/4$. The foregoing voltage $V_T/4$ propagates down the interconnect network 110 towards the reference numeral 308. At the same time, at the reference numeral 308, the voltage $V_{INT}$ is about $V_T$. As a result, a voltage $V_T/2$ propagates down the interconnect network 110 towards the reference numeral 306. The two voltage wave fronts travelling in opposite directions collide somewhere between the reference numerals 306 and 308, thereby resulting in an interconnect network voltage $V_{INT}$ of about $(\frac{3}{4})*V_T$. The voltage $V_{INT}=(\frac{3}{4})*V_T$ is recognized as a logic low since $(\frac{3}{4})*V_T$ is less than $(\frac{7}{8})*V_T$. The voltage $V_{INT}$ eventually and continuously decreases to approximately $V_T/2$, thereby enhancing its recognition as a logic low.

In the conventional art, which does not implement the output resistance $R_O$ pursuant to the present invention, a wait period (dead time) would need to exist between the point at which the nth driver 104 relinquished mastership of the interconnect network 110 and the point at which the 1st driver 102 was able to induce a logic low on the interconnect network 110. The reason is that no voltage appear on the interconnect network 110 to sink the current $I_{O1}$ into the 1st driver 102. In other words, the subsequently active driver 102 cannot drive a logic low onto the interconnect network 110 if it wishes.

Another aspect of the present invention is that "wire-ORing" can take place without adverse effects to data communications. Wire-ORing occurs on the interconnect network 110 when more than one of the n drivers 102, 104 drives a logic signal on the same line of the interconnect network 110. In the preferred embodiment, wire-ORing is permitted on the control lines of the interconnect network 110. For example, wire-ORing is permitted when a "broadcast" occurs in the data communication network 300, which concept is well known in the art. When a broadcast occurs, more than one of the drivers associated with each of the destination receivers may pull the "wait line" low to temporarily delay the broadcast until all of the destination devices are ready to receive.

When wire-ORing occurs on the interconnect network 110, the interconnect network 110 is pulled close to ground potential, or well below $V_T/2$. Consequently, during a subsequent cycle, none of the n drivers 102, 104 can immediately drive a signal, specifically, a logic low, onto the interconnect network 110 until a voltage $V_{INT}$ is restored. In order to permit wire-ORing in the present invention without adverse effects, a waiting period is inserted into the interconnect network protocol to allow for recovery of the voltage $V_{INT}$.

Figure 4A:
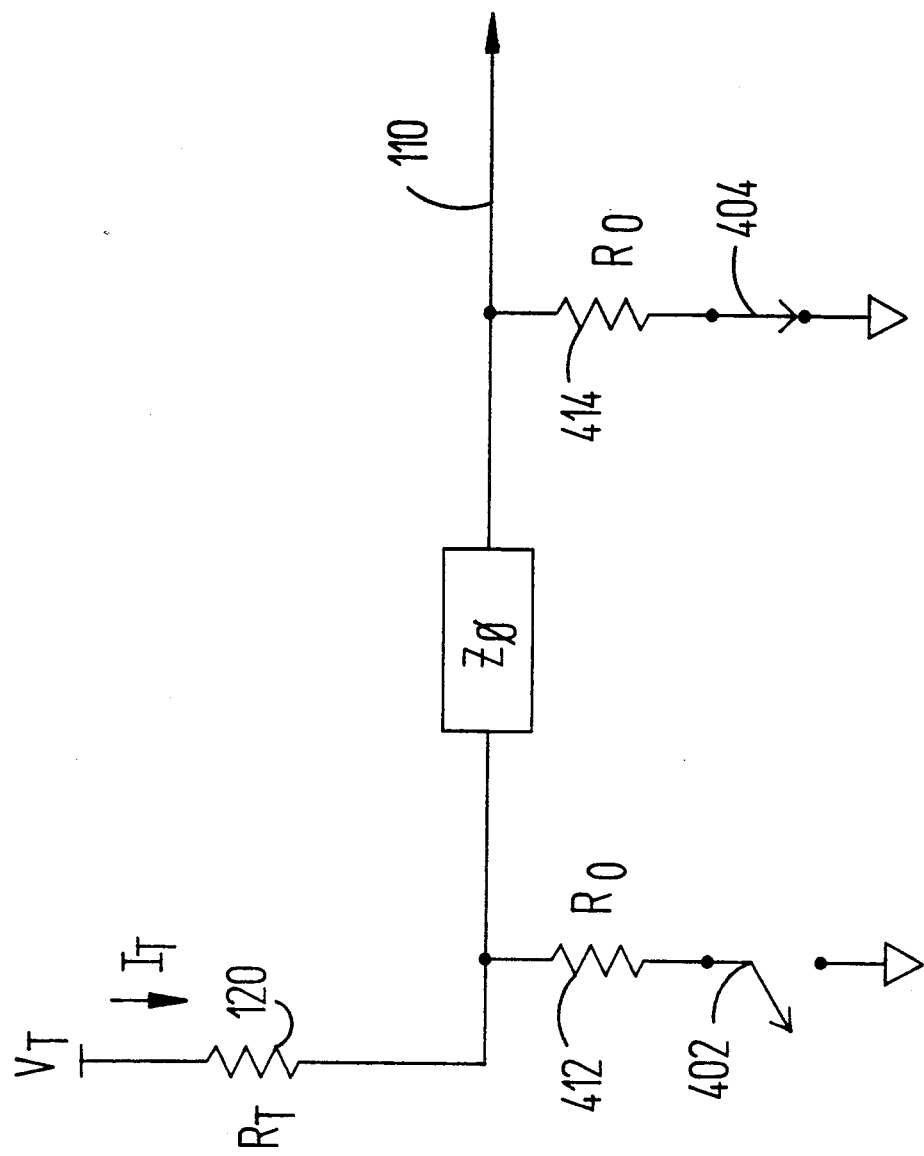
FIGS. 4(a)–4(c) show hypothetical circuit models for deriving the numerical value of the output resistance $R_O$, in accordance with the present invention.
Figure 4B:
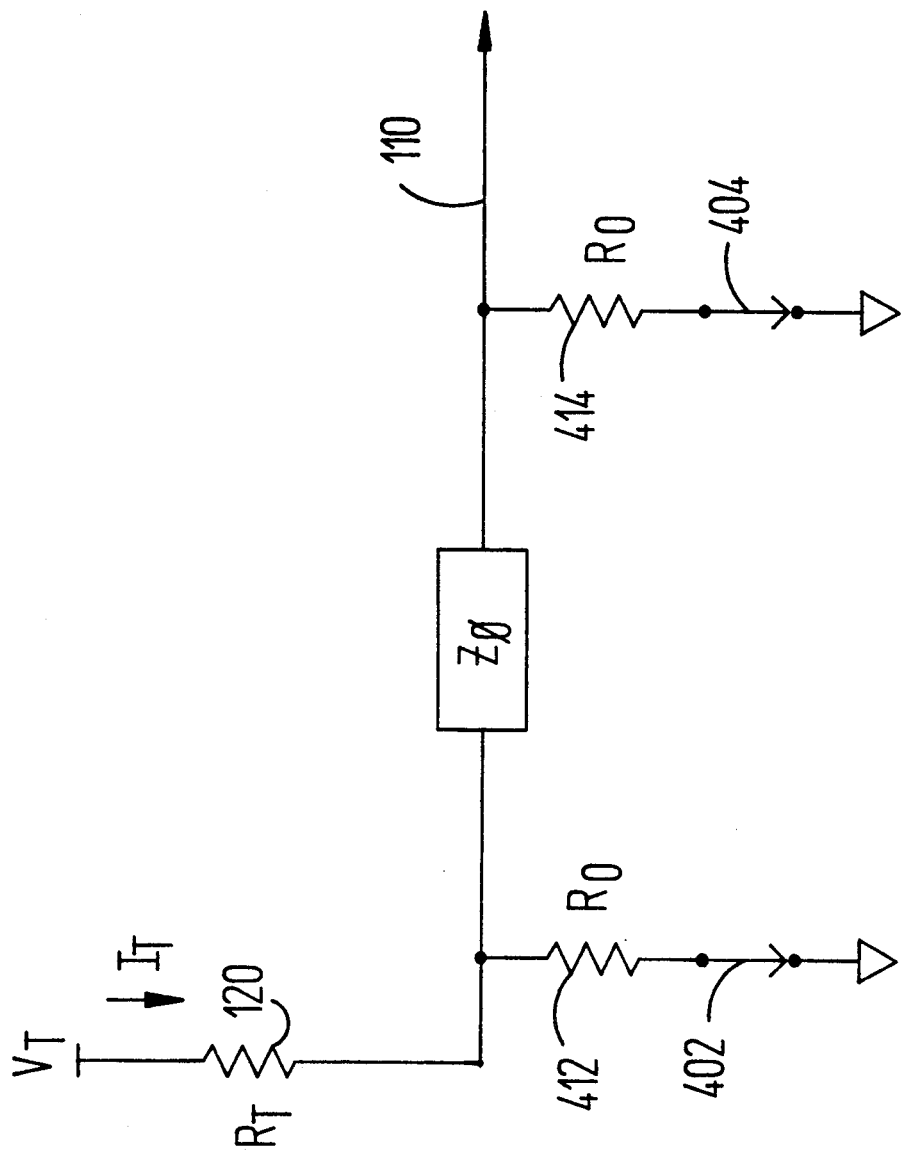
Figure 4C:
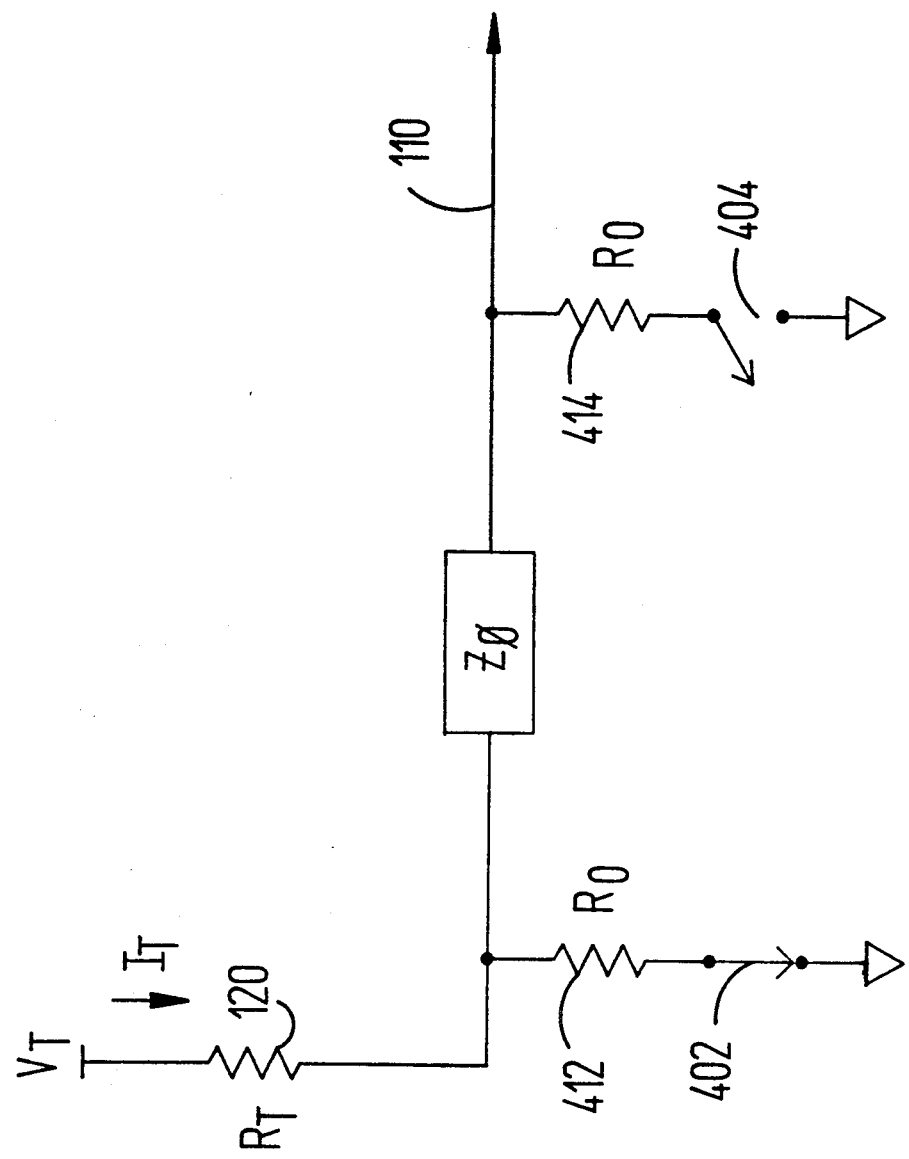
Figure 5:
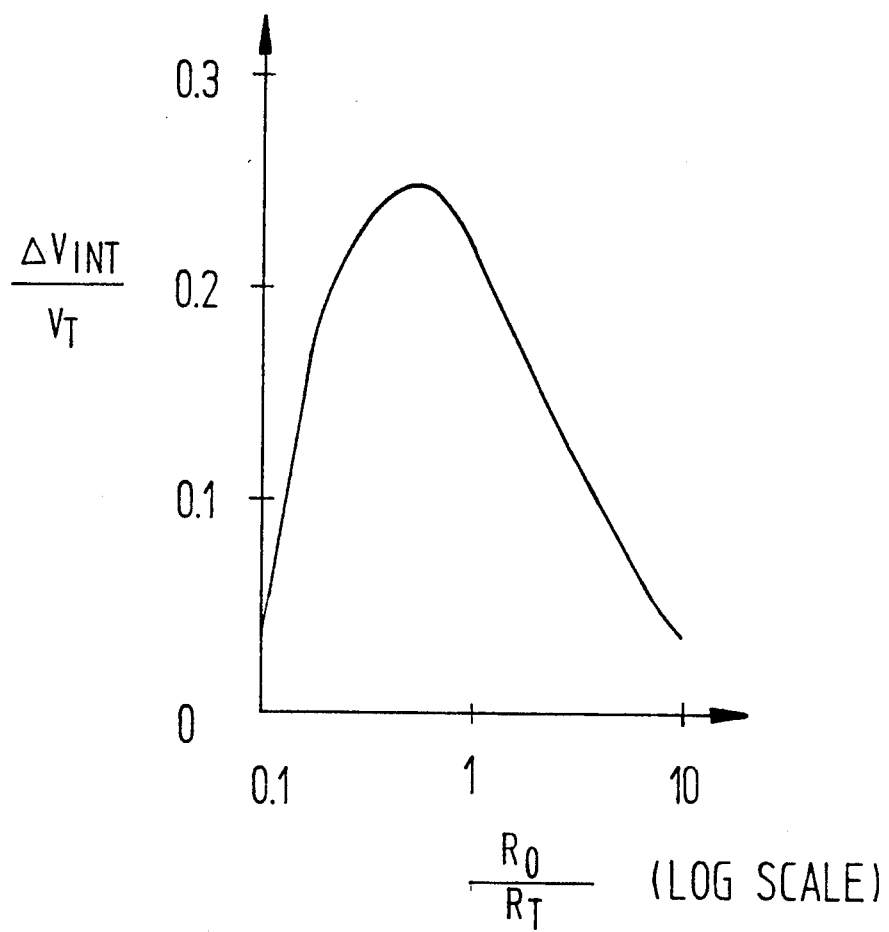
FIG. 5 shows a graph of the ratio $\Delta V_{INT}/V_T$ versus the ratio $R_O/R_T$ for deriving the value of the output resistance $R_O$, in accordance with the present invention.

The derivation of the numerical value of resistance $R_O$ is now discussed in relation to FIGS. 4 and 5. FIGS. 4(a)-4(c) illustrate hypothetical circuit models for the derivation of the resistance $R_O$. FIG. 5 shows a graph of the ratio $\Delta V_{INT}/V_T$ versus the ratio $R_O/R_T$ for the derivation of the output resistance $R_O$.

More specifically, FIGS. 4(a)-4(c) illustrate at a high conceptual level the sequence of "effective" circuits developing when a driver 402 is assuming mastership over the interconnect network 110 and attempts to drive a logic low, after a driver 404 has relinquished mastership and was previously driving a logic low.

FIG. 4(a) shows the data communication network 300 in an initial state with the driver 404 driving a logic low onto the interconnect network 110. In other words, the driver 404 pulls the interconnect network 110 towards ground. At the same time, the inoperative driver 402 exhibits high resistance, or an open circuit as shown.

Based upon Kirchoff's voltage laws and assuming the magnitude of the characteristic impedance $Z_0$ to be approximately equal to $R_T$, the interconnect network voltage $V_{INTa}$ for FIG. 4(a) is computed as follows:

$$V_{INTa} = V_T * \frac{R_O}{R_T/2 + R_O}$$

FIG. 4(b) shows the data communication network 300 in the transitional state with the two drivers 402,404 pulling the interconnect network 110 to ground. Essentially, the driver 402 attempts to drive a logic low onto the interconnect network 110, while the driver 404 attempts to relinquish control. However, effectively, the driver 404 can be modelled as still attempting to pull the interconnect network 110 to ground, as shown, during the transitional state, because its effect on the interconnect network 110 endures after it opens. Based upon Kirchoff's voltage laws, the interconnect network voltage $V_{INTb}$ in FIG. 4(b) is computed as follows:

$$V_{INTb} = V_{INTa} * \frac{R_O}{R_T/2 + R_O}$$

Finally, FIG. 4(c) shows the final state of the mastership change over wherein the driver 402 drives a logic low onto the interconnect network 110, while the driver 404 exhibits a high resistance, or an open circuit as shown.

Essentially, the value of the output resistance $R_O$ must be selected so as to maximize the signal on the interconnect network 110 when the change over in mastership occurs. Accordingly, this objective logically implies that the mathematical equation describing the difference in the interconnect network voltages $V_{INTa}$ and $V_{INTb}$ for the respective circuits depicted in FIGS. 4(a) and 4(c) must be maximized. The mathematical equation describing the difference to be maximized is as follows:

$$\Delta V_{INT} = V_{INTa} - V_{INTb}$$

$$\frac{\Delta V_{INT}}{V_T} = \frac{R_O}{R_T/2 + R_O} - \left( \frac{R_O}{R_T/2 + R_O} * \frac{R_O}{R_T/2 + R_O} \right)$$

$$\frac{\Delta V_{INT}}{V_T} = \frac{R_O}{R_T/2 + R_O} * \left( 1 - \frac{R_O}{R_T/2 + R_O} \right)$$

$$\frac{\Delta V_{INT}}{V_T} = \frac{(R_O/R_T)}{0.5 + (R_O/R_T)} * \left( 1 - \frac{(R_O/R_T)}{0.5 + (R_O/R_T)} \right)$$

FIG. 5 illustrates a graph of the above equation. With respect to this equation, the objective is to select an output resistance $R_O$ so as to maximize the ratio $\Delta V_{INT}/V_T$. Table A below indicates coordinate points of interest on the curve.

TABLE A

| $R_O/R_T$ | $\Delta V_{INT}/V_T$ |
|---|---|
| 0.1 | 0.045 |
| 0.2 | 0.204 |
| 0.5 | 0.250 |
| 1.0 | 0.222 |
| 2.0 | 0.160 |
| 5.0 | 0.083 |
| 10.0 | 0.045 |

With reference to FIG. 5 and Table A above, it is apparent that the peak value for the ratio $\Delta V_{INT}/V_T$ occurs when the ratio $R_O/R_T$ equals approximately 0.5. Thus, in an ideal sense, in order to implement an output resistance $R_O$ at the output of each of the n drivers 102, 104 of FIG. 3, while at the same time maintaining the maximum interconnect network voltage $V_{INT}$ during a change-over in mastership, the ratio $R_O/R_T$ must equal about 0.5. This further implies that $R_O=(\frac{1}{2})*R_T$ at the peak value for the ratio $\Delta V_{INT}/V_T$.

However, it should be noted that many real-world drivers may exhibit a nonzero output resistance due to non-ideal factors. In this instance, the output resistances $R_O$ should be reduced to some extent in order to compensate for the nonzero output resistance of the drivers.

In one feasible implementation of the preferred embodiment, $R_T=Z_0=2*R_O=50$ ohms with $V_T=3.3$ volts. However, it should be appreciated that many other circuit parameters are envisioned by the present invention.

The foregoing description of the preferred embodiment of the present invention has been presented for mere purposes of illustration and description. It is not intended to be exhaustive or to limit the present invention to the precise forms disclosed, and obviously many modifications and variations are possible in light of the above teachings. It is intended that the scope of the present invention be broadly defined by the claims appended hereto.

The following is claimed:

1. In a data communication system having a plurality of two-state drivers communicating to a plurality of two-state receivers via an interconnect network biased by a terminal supply voltage through a terminal resistance equal to the characteristic impedance of the interconnect network, an improvement for optimizing speed by eliminating the need for a wait period during the changing over of driver mastership, the improvement comprising an output resistance for connecting said interconnect network and each driver output, said output resistance being equal to about half of said terminal resistance, whereby said output resistance reduces voltage swing on said interconnect network and thereby increases available voltage on said interconnect network during said changing over of said driver mastership to permit driving overlap by said drivers.

2. The improvement of claim 1, wherein the voltage swing between logic states on said interconnect network is equal to approximately half of said terminal supply voltage.

3. The improvement of claim 1, wherein any signal on said interconnect network below seven-eighths of said terminal supply voltage is recognized as a logic low and wherein any signal on said interconnect network above seven-eighths of said terminal supply voltage is recognized as a logic high.

4. The improvement of claim 1, wherein said output resistance comprises a discrete resistive element and further comprising a transistor associated in series with each said output resistance, said transistor configured to switch said output resistance to either ground or an open circuit.

5. A system for optimizing the speed of an interconnect network by eliminating the need for a wait period during changing over of driver mastership, comprising:
 a terminal supply voltage biasing said interconnect network;
 a terminal resistance configured to terminate said interconnect network to thereby prevent reflections;

a first driver means for driving a logic low on said interconnect network, said logic low being at a first voltage which is between said terminal supply voltage and ground;

a second driver means for inducing a logic low on said interconnect network after said first driver means via sinking current so that said interconnect network temporarily exhibits a second voltage which is between said terminal supply voltage and said first voltage, said second voltage eventually reducing to said first voltage;

a first and second output resistance means for connecting respectively said first and second driver means to said interconnect network and for reducing the voltage swing between logic states on said interconnect network to approximately half of said terminal supply voltage, said first and second output resistance means for permitting concurrent driving of said interconnect network by said first and second driver means via increasing the available voltage on said interconnect network during said concurrent driving; and a receiver means associated with said interconnect network, said receiver means for recognizing both said first voltage and said second voltage as a logic low.

6. The improvement of claim 5, wherein any signal on said interconnect network below seven-eighths of said terminal supply voltage is recognized as a logic low and wherein any signal on said interconnect network above seven-eighths of said terminal supply voltage is recognized as a logic high.

7. The improvement of claim 5, wherein said first and second output resistance means comprise a discrete resistive element and further comprise a transistor associated in series with said discrete resistive element to switch said element to either ground or an open circuit.

8. A method for eliminating the need for a wait period during the changing over of driver mastership in a data communication system having a plurality of two-state drivers communicating to a plurality of two-state receivers via an interconnect network biased by a terminal supply voltage through a terminal resistance equal to the characteristic impedance of said interconnect network and having an output resistance situated between each driver output and said interconnect network, the output resistance being equal to about half of the terminal resistance, whereby said output resistance reduces voltage swing on said interconnect network to thereby increase available voltage on said interconnect network during said changing over of said driver mastership to permit concurrent driving by said drivers, the method comprising the steps of:

producing a logic low on said interconnect network via a first driver, said logic low being at a first voltage which is between said terminal supply voltage and ground;

relinquishing control of said interconnect network;

inducing immediately a logic low on said interconnect network by sinking current into a second driver so that said interconnect network exhibits a second voltage which is between said terminal supply voltage and said first voltage; and recognizing said second voltage as a logic low at one or more of said receivers.

9. The method of claim 8, further comprising the steps of permitting said second voltage to reduce to said first voltage and recognizing said first voltage as a logic low.

10. The method of claim 8, further comprising the step of performing wire-ORing on said interconnect network.

11. In a data communication system having a plurality of two-state drivers communicating to a plurality of two-state receivers via an interconnect network biased by a terminal supply voltage through a terminal resistance equal to the characteristic impedance of the interconnect network, an improvement for optimizing speed by eliminating the need for a wait period during the changing over of driver mastership, the improvement comprising an output resistance situated between said interconnect network and each driver output, said output resistance being equal to about half of said terminal resistance, said output resistance for reducing voltage swing between logic states on said interconnect network to approximately half of said terminal supply voltage, whereby available voltage on said interconnect network during said changing over of said driver mastership is increased to permit concurrent driving by said drivers.

12. The improvement of claim 11, wherein any signal on said interconnect network below seven-eighths of said terminal supply voltage is recognized as a logic low and wherein any signal on said interconnect network above seven-eighths of said terminal supply voltage is recognized as a logic high.

13. The improvement of claim 11, wherein said output resistance comprises a discrete resistive element and wherein said improvement further comprises a transistor associated in series with each said output resistance, said transistor configured to switch said output resistance to either ground or an open circuit.

14. In a data communication system having a plurality of two-state drivers communicating to a plurality of two-state receivers via an interconnect network biased by a terminal supply voltage through a terminal resistance equal to the characteristic impedance of the interconnect network, an improvement for optimizing speed by permitting overlapping of driver mastership via reducing voltage swing on said interconnect network, the improvement comprising an output resistance situated between said interconnect network and each driver output, said output resistance being equal to about half of said terminal resistance, wherein any signal on said interconnect network below seven-eighths of said terminal supply voltage is recognized as a logic low and whereby any signal on said interconnect signal above seven-eighths of said terminal supply voltage is recognized as a logic high, whereby said output resistance reduces voltage swing on said interconnect network to thereby increase available voltage on said interconnect network during said changing over of said driver mastership to permit concurrent driving by said drivers.

15. The improvement of claim 14, wherein said voltage swing between logic states on said interconnect network is equal to approximately half of said terminal supply voltage.

16. The improvement of claim 14 wherein said output resistance comprises a discrete resistive element and wherein said improvement further comprises a transistor associated in series with each said output resistance, said transistor configured to switch said output resistance to either ground or an open circuit.

* * * * *